Jan. 24, 1961  M. G. GIBBS  2,969,411
INDUCTION HEATED FURNACES
Filed Aug. 28, 1958  2 Sheets-Sheet 1

INVENTOR
MAURICE G. GIBBS
Imirie & Smiley
ATTYS.

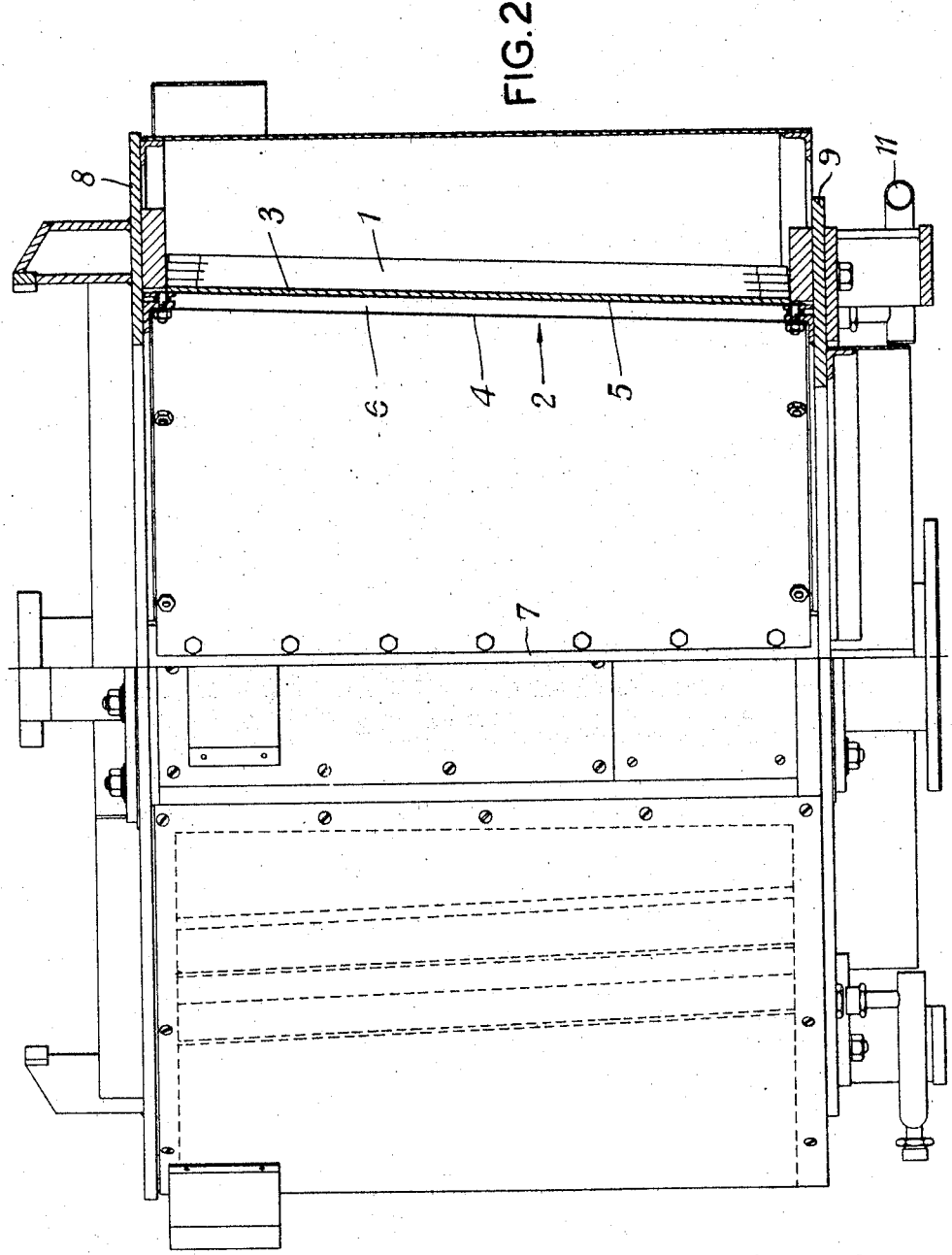

United States Patent Office 2,969,411
Patented Jan. 24, 1961

2,969,411

INDUCTION HEATED FURNACES

Maurice G. Gibbs, Watford, England, assignor to Wild-Barfield Electric Furnaces Limited, Watford, England Filed Aug. 28, 1958, Ser. No. 757,748

Claims priority, application Great Britain Sept. 4, 1957

6 Claims. (Cl. 13—27)

This invention relates to induction heated furnaces and particularly though not essentially to induction heating melting furnaces of the coreless type.

Melting furnaces of this type consist of a crucible or the equivalent surrounded by an inductor usually in the form of a multi-turn coil which may have one or more layers. A space is provided between the inductor and the crucible which is filled with a suitable thermal insulating material, of which the purpose is to reduce heat losses to a minimum but which also tends to protect the inductor from becoming overheated. In most cases, however, the ohmic heating of the inductor is such as to necessitate water cooling in order to prevent it getting too hot although in some favourable circumstances it is possible to avoid water cooling. In either case it is of importance to avoid the risk of molten metal escaping from the crucible (should this leak or break) contacting other parts of the furnace.

In the case of a water cooled inductor, molten metal making contact with and melting the cooling tube would give rise to the possibility of an explosive escape of steam. In the case of an air-cooled inductor, the molten metal might damage the insulation of the inductor. It is also important in this latter case to prevent the inductor from attaining an excessive temperature.

In accordance with the present invention, the inductor of an induction furnace surrounds a former comprising two spaced coaxial elements of non-magnetic metal having a high electrical resistivity (such as stainless steel) and designed to minimize the production of induced currents therein, these elements providing an annular air space between them. In the event of leakage from a crucible within the inductor the elements protect the inductor from contact with the molten metal.

From another aspect, the invention provides an induction furnace in which the inductor is mounted on a former comprising two coaxial cylinders or truncated cones spaced apart to provide an annular air space and having flanges at top and bottom extending over the inductor, these cylinders or truncated cones being of non-magnetic, high resistivity metal split longitudinally into two or more sections, the sections being joined to each other by strips of electrical insulating material to limit flow of induced currents in the cylinders or truncated cones and to prevent electromagnetic screening between the inductor and a vessel mounted within the former.

Means may be provided to circulate air through the space between the cylinders or truncated cones and baffles are provided in this space to direct the air flow.

Other parts of the invention are embodied in the preferred form which will now be described in some detail by way of example with reference to the attached drawings in which:

Fig. 2 is an elevation, partly in section of an induction furnace incorporating a former generally similar to that shown in Fig. 1.

Figure 1:
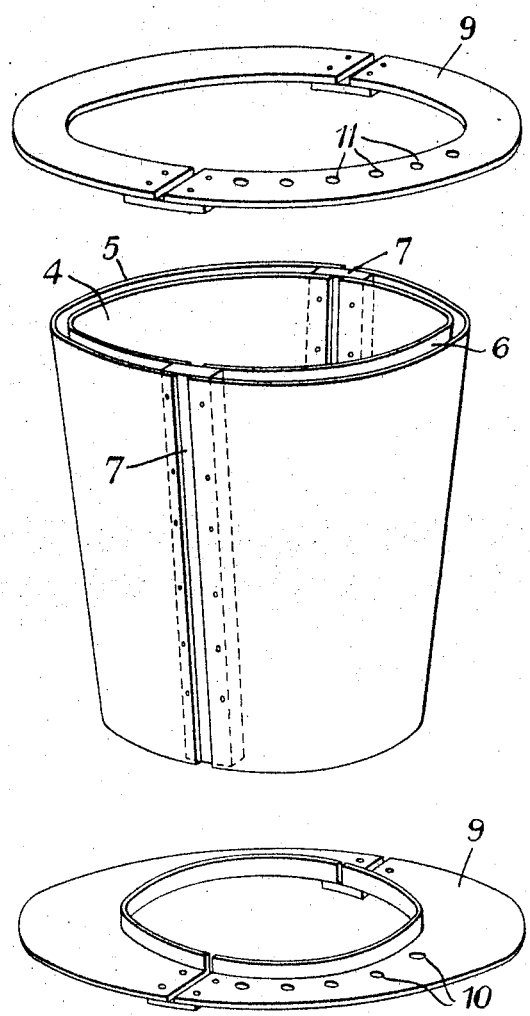
Fig. 1 is an exploded view of a former.

As shown, the inductor 1 of an induction heated melting furnace of the coreless type is mounted on the outside of a double skinned former 2 of truncated cone shape. The inductor 1 is separated from the former 2 by layers of insulating material 3, preferably of glass and mica to withstand high temperatures.

The former comprises inner and outer walls 4, 5, spaced apart so as to provide an air space 6 between them. Each wall is of truncated conical shape and is made up of two stainless steel sections, each extending over a little less than a semicircle. The two sections of each wall 4, 5, are joined by two strips of insulating material 7, which prevents a complete conductive path around the wall and also serves to space the two walls apart. The stainless steel has a high electrical resistivity and the walls are of such thickness that the production of induced currents therein is reduced to a minimum.

This form of construction ensures, firstly that no current can flow around the two cylinders and that, therefore, no heating of these cylinders can occur thereby, and secondly, that no electro-magnetic screening occurs between the inductor and the vessel to be heated (not shown) which is mounted inside the double skinned former described.

The two cones or cylinders 4, 5, are assembled between top and bottom plates 8, 9, which form part of the structure of the furnace and form annular flanges between which the inductor is mounted. Holes 10 are drilled through the bottom plate in such a position as to enter the annular air space between the cylinders, and further holes 11 are provided in the top plate in a similar position.

Air, which may be supplied from a normal compressed air line, or from a fan incorporated in the furnace, is then passed into the annular air space through suitable ducting 11 connected to the holes in the bottom plate, is directed between the two cones or cylinders 4, 5, and finally ejected for example through ducting attached to the top plate.

The space between the inside of the former and the outside of the vessel to be heated may be filled with a heat insulating material such as magnesium oxide lagging powder.

It will be understood that the invention is not restricted to the details of the preferred form described by way of example which may be modified without departing from the broad ideas underlying them.

I claim:

1. An induction furnace having an inductor and a former surrounded by the inductor and comprising two spaced coaxial elements of non-magnetic material having a high electrical resistivity and designed to minimize the production of induced currents therein, said elements providing an annular air space between them.

2. An induction furnace having an inductor and a former on which the inductor is mounted and comprising two coaxial walls spaced apart to provide an annular air space and having flanges at top and bottom extending over the inductor, said walls being of non-magnetic, high resistivity metal split longitudinally into two or more sections, the sections being joined to each other by strips of electrical insulating material to limit flow of induced currents in the walls and to prevent electromagnetic screening between the inductor and a vessel mounted within the former.

3. An induction furnace for the induction heating of a vessel, including a former comprising two coaxial spaced walls enclosing an annular air space, said walls being of non-magnetic high resistivity metal and being split longitudinally into at least two sections, strips of electrical insulating material connecting said sections, and an inductor surrounding said former.

4. An induction furnace according to claim 3 in which the walls of the former are of stainless steel.

5. An induction furnace according to claim 3 having means to circulate cooling fluid between the walls of the former.

6. A former for the inductor of an induction furnace comprising spaced inner and outer coaxial walls of non-magnetic high resistivity metal, spaced apart to provide an air space therebetween, each of said walls comprising at least two sections joined by longitudinal strips of electrical insulating material.

References Cited in the file of this patent

UNITED STATES PATENTS

| | | |
|---|---|---|
| 390,964 | Hay | Oct. 9, 1888 |
| 1,640,799 | Northrup | Aug. 30, 1927 |
| 1,795,842 | Davis | Mar. 10, 1931 |
| 1,801,791 | Breisky et al. | Apr. 21, 1931 |
| 1,810,820 | Davis et al. | June 16, 1931 |